(12) United States Patent
Thomas et al.

(10) Patent No.: US 10,823,391 B2
(45) Date of Patent: Nov. 3, 2020

(54) EDGE LIT MIRROR

(71) Applicant: Hubbell Incorporated, Shelton, CT (US)

(72) Inventors: Will Thomas, Anderson, SC (US); Linkoln Dixon, Greer, SC (US); David Simoni, Greenville, SC (US); Jared Davidson, Simpsonville, SC (US)

(73) Assignee: Hubbell Incorporated, Shelton, CT (US)

( * ) Notice: Subject to any disclaimer, the term of this patent is extended or adjusted under 35 U.S.C. 154(b) by 131 days.

(21) Appl. No.: 16/153,288

(22) Filed: Oct. 5, 2018

(65) Prior Publication Data

US 2019/0107275 A1    Apr. 11, 2019

Related U.S. Application Data

(60) Provisional application No. 62/568,389, filed on Oct. 5, 2017.

(51) Int. Cl.
*F21V 8/00*     (2006.01)
*F21V 23/00*    (2015.01)
*F21V 33/00*    (2006.01)
*F21Y 115/10*   (2016.01)

(52) U.S. Cl.
CPC .......... *F21V 33/004* (2013.01); *F21V 23/003* (2013.01); *G02B 6/0055* (2013.01); *F21Y 2115/10* (2016.08)

(58) Field of Classification Search
CPC ........ A45D 42/10; A47G 1/04; F21V 23/003; F21V 33/004; G02B 6/0056
USPC ......................................... 362/606, 140, 135
See application file for complete search history.

(56) References Cited

U.S. PATENT DOCUMENTS

| 9,170,353 | B2 * | 10/2015 | Chang ...................... A47G 1/02 |
| 2009/0251920 | A1 * | 10/2009 | Kino ...................... B60Q 1/323 |
| | | | 362/602 |
| 2011/0283577 | A1 * | 11/2011 | Cornelissen ............. A47G 1/02 |
| | | | 40/582 |

* cited by examiner

*Primary Examiner* — Karabi Guharay
(74) *Attorney, Agent, or Firm* — Michael Best & Friedrich, LLP

(57) ABSTRACT

A mirror assembly includes a frame, a mirror platform, a light emitting element, a light guide, an interior reflective surface, and a back plate. The mirror platform includes a central reflective portion and a translucent portion. The light emitting element is retained within the frame and driven by a driver. The light guide plate is disposed adjacent the light emitting element and includes two opposed major surfaces that propagate light along the light guide plate. The interior reflective surface is disposed adjacent a rear major surface of the light guide plate. The back plate is affixed to the frame, securing the mirror platform, the light emitting element, the driver, the light guide, and the interior reflective surface therebetween.

20 Claims, 7 Drawing Sheets

EDGE LIT MIRROR

BACKGROUND

The present disclosure relates to illuminated mirrors. More specifically, the present disclosure relates to low-profile illuminated mirrors.

SUMMARY

In one embodiment, a mirror assembly includes a frame, a mirror platform, a light emitting element, a light guide, an interior reflective surface, and a back plate. The mirror platform includes a central reflective portion and a translucent portion. The light emitting element is retained within the frame and driven by a driver. The light guide plate is disposed adjacent the light emitting element and includes two opposed major surfaces that propagate light along the light guide plate. The interior reflective surface is disposed adjacent a rear major surface of the light guide plate. The back plate is affixed to the frame, securing the mirror platform, the light emitting element, the driver, the light guide, and the interior reflective surface therebetween.

In some embodiments, the mirror platform includes a second transparent portion. In some embodiments, light emitting element comprises an LED. In some embodiments, the frame comprises a rectilinear shape. In other embodiments, the frame comprises a curvilinear shape. In some embodiments, the mirror assembly includes a second light emitting element.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
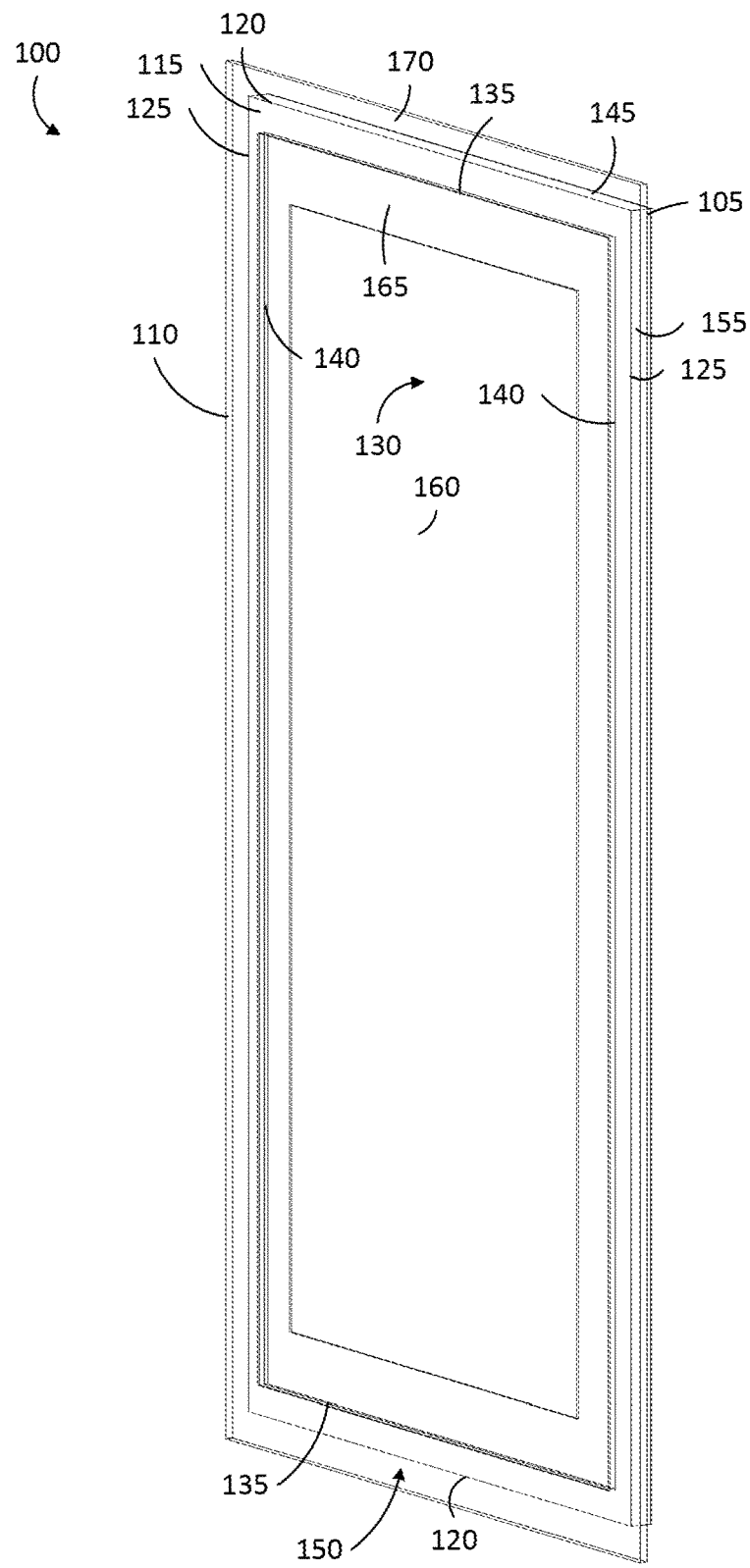
FIG. 1 is a perspective view of a mirror assembly according to a first embodiment.

FIG. 1 illustrates a perspective view of a mirror assembly 100. The mirror assembly 100 includes a frame 105 supporting a mirror platform 110. The frame includes a generally planar front frame surface 115 which defines an exterior profile of the frame 105. In the illustrated embodiment, the front frame surface 115 defines a rectilinear exterior profile including two opposed exterior minor sides 120 and two opposed exterior major sides 125. Alternatively, the front frame surface 115 may define a rectilinear exterior profile having more or fewer sides, such as a triangle or pentagon, a curvilinear shape, such as a circle or an ellipse, or any combination thereof.

The frame 105 further includes a central aperture 130 defined by an interior profile of the front frame surface 115. In the illustrated embodiment, the front frame surface 115 defines a rectilinear interior profile including two opposed interior minor sides 135 and two opposed interior major sides 140. Alternatively, the front frame surface 115 may define a rectilinear interior profile having more or fewer sides, such as a triangle or pentagon, a curvilinear shape, such as a circle or an ellipse, or any combination thereof.

Extending backward from the exterior minor sides 120 of the front frame surface 115 of the frame 105, a top frame surface 145 and a bottom frame surface 150, also referred to as sidewalls, are generally normal to the front frame surface 115. Extending backward from the exterior major sides 125 of the front frame surface 115, a pair of parallel side frame surfaces 155, also referred to as sidewalls, is generally normal to the front frame surface 115 and perpendicular to the top frame surface 145 and the bottom frame surface 150. The top frame surface 145, the bottom frame surface 150, and the side frame surfaces 155 are generally coextensive, extending backward from the front frame surface 115 to define a profile depth of the frame 105 (e.g. profile depth 222 of FIG. 3).

The mirror platform 110 is affixed to the frame 105 by any suitable fastening means, for example, fasteners, welds, or adhesives. The mirror platform 110 is a planar solid having a rectangular shape. In the illustrated embodiment, the mirror platform 110 extends beyond the exterior major and minor sides 125, 120 of the front frame surface 115. In some embodiments, the mirror platform 110 is generally coextensive with the exterior major and minor sides 125, 120 of the front frame surface 115.

The mirror platform 110 includes a central reflective portion 160, a translucent portion 165, and a peripheral portion 170. The translucent portion 165, also referred to as a frosted portion, has minimal reflectivity, and is formed from any suitable material, such as frosted glass, acid etched glass, or clear glass. The number, configuration, and arrangement of translucent portions 165 can be varied to achieve different lighting effects. In the illustrated embodiment, the translucent portion 165 is configured as a single continuous portion disposed between the central reflective portion 160 and the peripheral portion 170. In the illustrated embodiment, the translucent portion 165 is aligned with the central aperture 130 of the frame 105.

Figure 2:
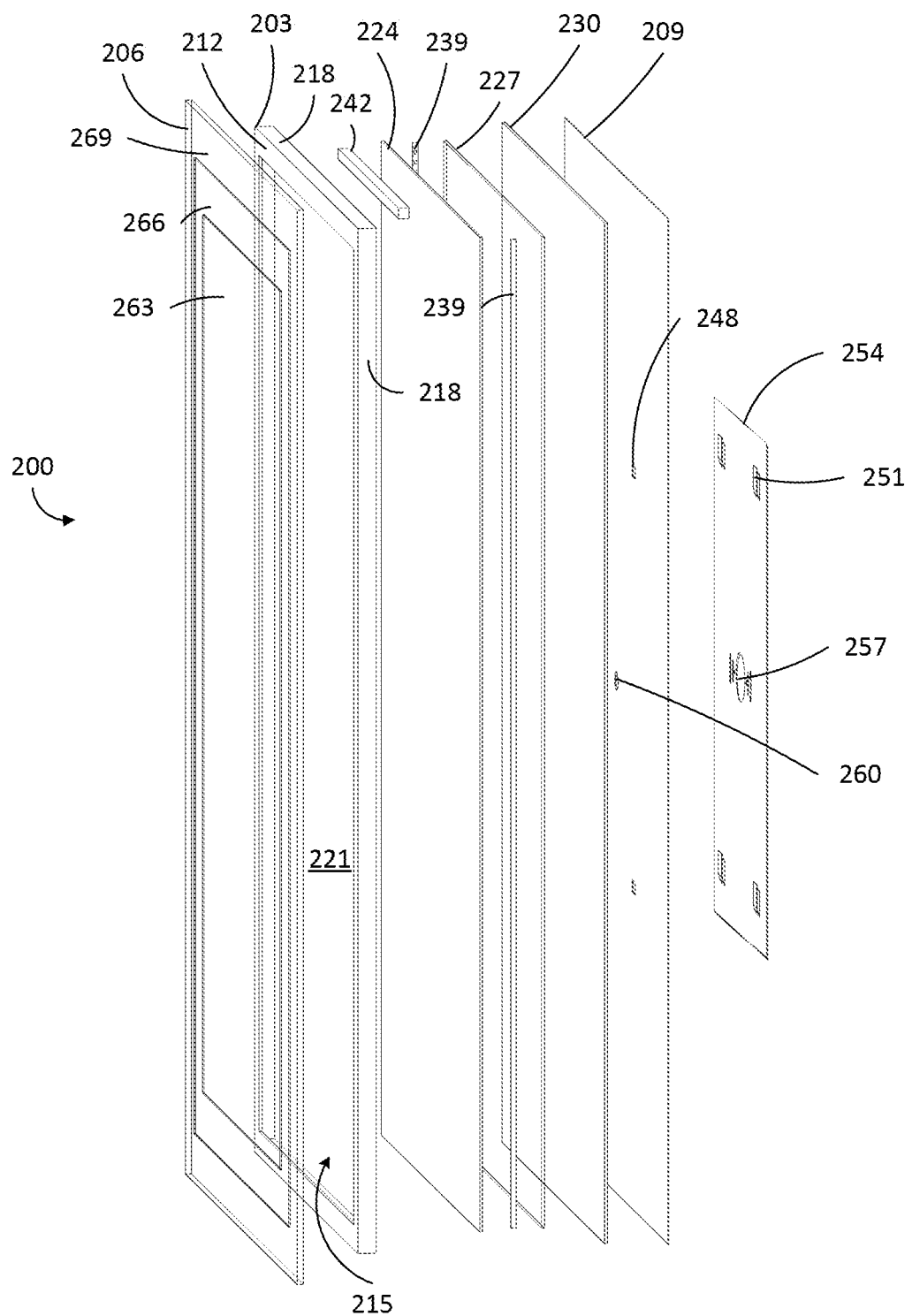
FIG. 2 is an exploded view of the mirror assembly of FIG. 1.

FIG. 2 illustrates an exploded view of a mirror assembly 200. The mirror assembly 200 includes a frame 203, a mirror platform 206, and a back plate 209. The frame 203 includes a front frame surface 212 defining an exterior profile of the frame 203 and a central aperture 215 of the frame 203. The frame 203 further includes a plurality of sidewalls 218 extending backward from the front frame surface 212 and partially defining an interior 221 and a profile depth 222 of the frame 203.

Disposed within the interior 221 of the frame 203, the mirror assembly 200 includes a front reflective surface 224, a light guide plate 227, and a rear reflective surface 230. The front reflective surface 224 is disposed within the interior 221 adjacent to the central aperture 215 of the frame 203. The front reflective surface 224 is partially-reflective, configured to reflect a first portion of light incident an interior side of the front reflective surface 224 toward the interior 221 of the frame 203. The front reflective surface 224 further transmits a second portion of the light incident the interior side of the front reflective surface 224 through the central aperture 215.

Within the interior 221, the light guide plate 227 is disposed behind the front reflective surface 224. The light guide plate 227 is a solid article made from, for example, acrylic, polycarbonate, glass, or other appropriate material. The light guide plate 227 includes opposed major surfaces 231 and 233 bounded by minor surfaces 236. Light incident on the minor surfaces 236 propagates along the light guide plate 227 by total internal reflection at the opposed major surfaces 231 and 233 of the light guide plate 227. In some embodiments, the light guide plate 227 is configured to diffuse light propagated along the light guide plate 227. In the illustrated embodiment, the light guide plate 227 includes four minor surfaces 236. In some embodiments, the light guide plate 227 may include more or fewer minor surfaces 236.

Adjacent to at least one minor surface 236 of the light guide plate 227, a light emitting element 239 is configured to illuminate the minor surface 236. In the illustrated embodiment, two light emitting elements 239 are disposed adjacent to opposed minor surfaces 236 of the light guide plate 227. The light emitting elements 239 are disposed proximate the minor surfaces 236 and oriented inwardly to illuminate the light guide plate 227. The light emitting elements 239, for example, LEDs, are driven by a driver 242 provided within the frame 203. The driver 242 may be configured to receive AC power from an AC power source, such as a conventional electrical receptacle. Alternatively or additionally, the driver 242 may be configured to receive DC power from a DC power source, for example, a battery.

Disposed adjacent to the rear major surface 233 of the light guide plate 227 is the rear reflective surface 230, the rear reflective surface 230 having a high reflectance. In some embodiments, the reflectance is at least approximately 90%; in some embodiments the reflectance is at least approximately 98%. In some embodiments, the rear reflective surface 230 includes a layer of specular film in order to achieve this reflectance.

Accordingly, light emitted from the light emitting elements 239 enters the minor surfaces 236 and propagate along the light guide plate 227. Light transmitted from the rear major surface 233 of the light guide plate 227 is reflected by the rear reflective surface 230 and re-enters the light guide plate 227. Light transmitted from the front major surface 231 of the light guide plate 227 is incident upon the front reflective surface 224. The front reflective surface 224 reflects a first portion of the light toward the light guide plate 227. The front reflective surface 224 further transmits a second portion of the light through the central aperture 215.

In the illustrated embodiment, the light emitting elements 239 are configured to produce white light, but may be configured to produce any suitable light such as, for example, light of warmer or cooler temperatures. In some embodiments, the light emitting elements 239 are configured to produce color temperatures substantially similar to one or more of an incandescent bulb, a fluorescent bulb, and natural outdoor light.

Disposed adjacent the frame 203 and abutting at least one sidewall 218, the back plate 209 encloses the interior 221 of the frame 203. The back plate 209 includes a plurality of hanger apertures 248 configured to receive hanger arms 251 of a mounting bracket 254. The mounting bracket 254 includes a hand hole 257 and is configured to be installed flush with a wall. The mounting bracket 254 is installed such that the hand hole 257 is aligned with an electrical box within the wall. Accordingly, AC power may be received at the electrical box and transmitted to the driver 242 by wires routed through the hand hole 257 and a cable aperture 260 of the back plate 209.

The mirror platform 206 is affixed to the frame 203 by any suitable fastening means, for example, fasteners, welds, or adhesives. The mirror platform 206 is a planar solid having a rectangular shape. In the illustrated embodiment, the mirror platform 206 extends beyond the exterior profile of the frame 203. In some embodiments, the mirror platform 206 is generally coextensive with the exterior profile of the frame 203.

The mirror platform 206 includes a central reflective portion 263, a translucent portion 266, and a peripheral portion 269. The translucent portion 266, also referred to as a frosted portion, has minimal reflectivity, and is formed from any suitable material, such as frosted glass, acid etched glass, or clear glass. The number, configuration, and arrangement of translucent portions 266 can be varied to achieve different lighting effects. In the illustrated embodiment, the translucent portion 266 is configured as a single continuous portion disposed between the central reflective portion 263 and the peripheral portion 269. In the illustrated embodiment, the translucent portion 266 is aligned with the central aperture 215 of the frame 203. Accordingly, the mirror platform 206 is illuminated by light transmitted through the central aperture 215. In some embodiments, the peripheral portion 269 is reflective. In other embodiments, the peripheral portion 269 may be opaque, or fashioned as a frame, decorative structure, or the like.

Figure 3:
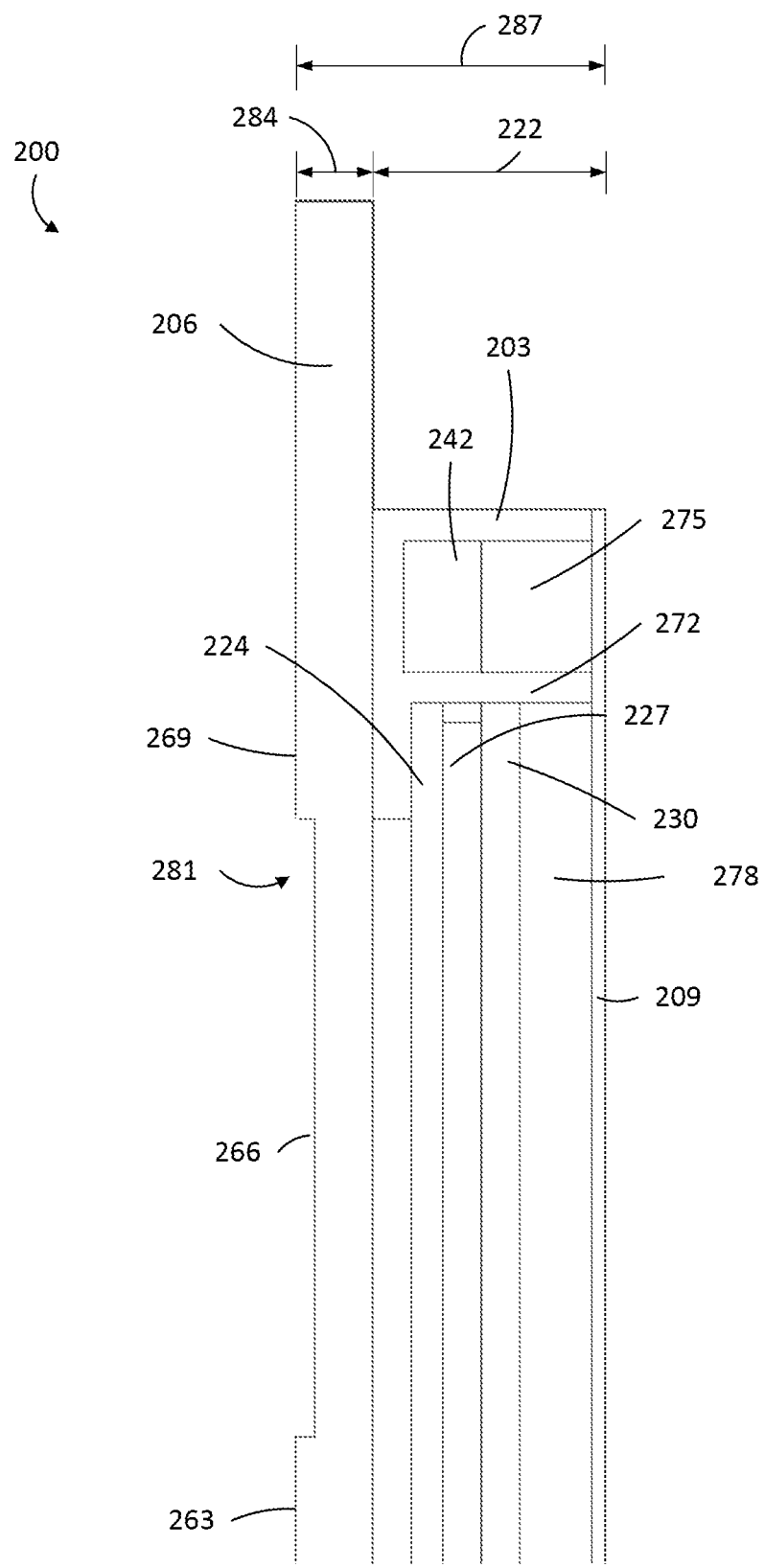
FIG. 3 is a sectional view of the mirror assembly of FIG. 1.

FIG. 3 illustrates an assembled sectional view of the mirror assembly 200, with similar enumeration provided for context. The frame 203 further includes a support rib 272 extending backward from the front frame surface. In some embodiments, the support rib 272 is continuous around the frame 203. In other embodiments, the support rib 272 includes one or more apertures or is provided as a plurality of support ribs 272. The support rib 272 is parallel to the sidewalls 218 and defines a frame channel 275 therebetween. The support rib 272 securely retains the front reflective surface 224, light guide plate 227, light emitting elements 239, and rear reflective surface 230 within the interior 221 of the frame 203.

In some embodiments, an outer dimension of the light guide plate 227 is less than an outer dimension of the front reflective surface 224 or the rear reflective surface 230. In some embodiments, the outer dimension is the light guide plate 227 is selected based on a dimension of the light emitting elements 239. The driver 242 is securely retained within the frame channel 275. In some embodiments, an interstice 278 may be defined in the interior between the rear reflective surface 230 and the back plate 209. The interstice 278 may be provided for routing wire from the cable aperture 260 to the driver 242.

In the illustrated embodiment, the translucent portion 266 of the mirror platform 206 forms a recessed profile 281 relative the central reflective portion 263 and the peripheral portion 269 of the mirror platform 206, but this is not required. Alternatively, the translucent portion 266 may be coplanar with or extend beyond the central reflective portion 263 and the peripheral portion 269. The recessed profile 281 is rectilinear, but may alternatively be curvilinear, concave, convex, or any other suitable profile. A mirror thickness 284 and the profile depth 222 of the frame 203 define an overall thickness 287 of the mirror assembly 200. In some embodiments, the overall thickness 287 of the mirror assembly 200 is less than 1".

Figure 4:
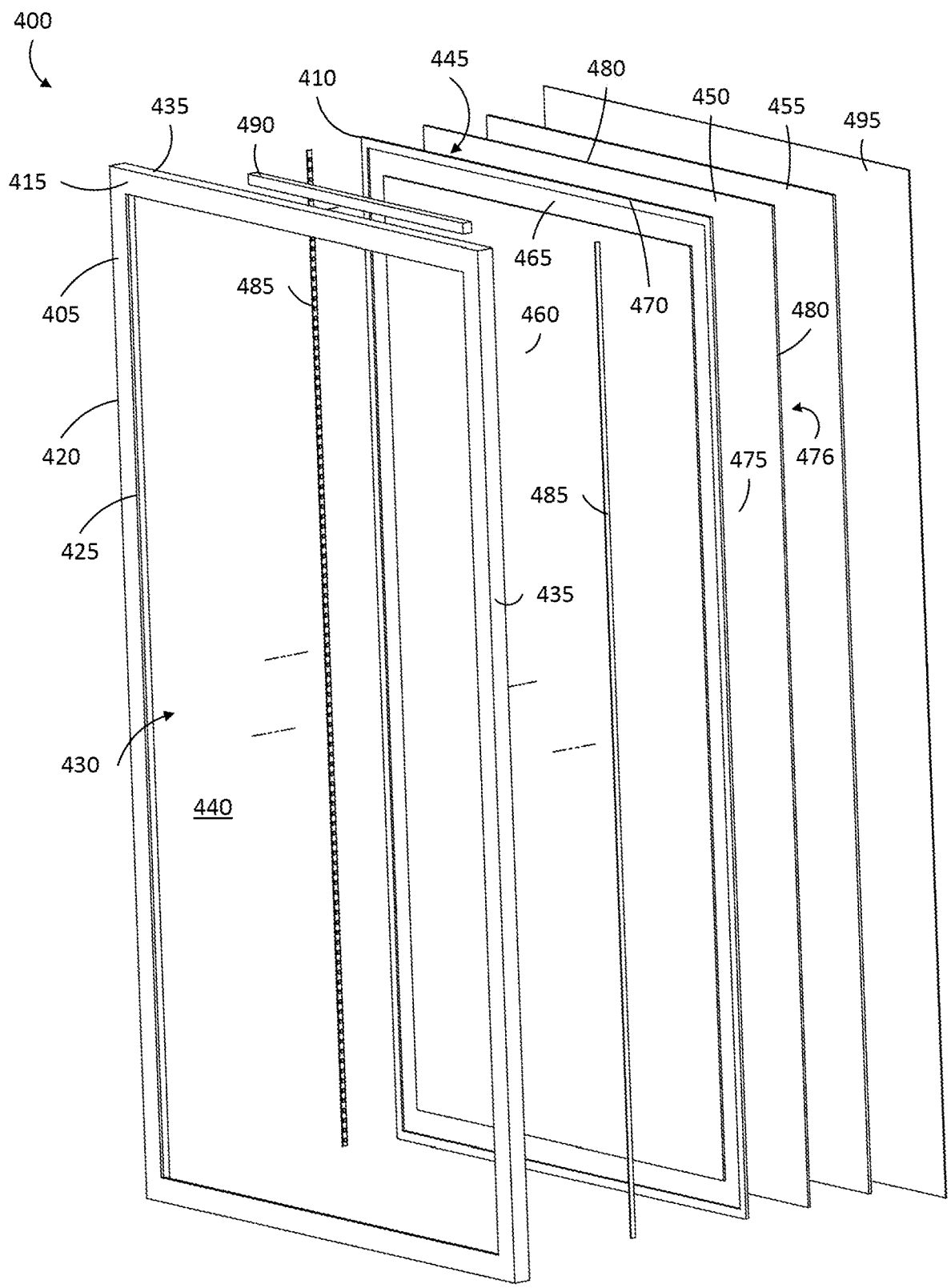
FIG. 4 is an exploded view of a mirror assembly according to a second embodiment.

FIG. 4 illustrates another embodiment of a mirror assembly 400. The mirror assembly 400 includes a frame 405 retaining a mirror platform 410. The frame includes a generally planar front frame surface 415 which defines an exterior profile of the frame 405. In the illustrated embodiment, the front frame surface 415 defines a rectilinear exterior profile 420. Alternatively, the front frame surface 415 may define a curvilinear shape, such as a circle or an ellipse, or any combination or rectilinear and curvilinear shapes.

The frame 405 further includes a central aperture 430 defined by an interior profile 425 of the front frame surface 415. In the illustrated embodiment, the front frame surface 415 defines a rectilinear interior profile 425. Alternatively, the front frame surface 415 may define an interior profile 425 having, a curvilinear shape, such as a circle or an ellipse, or any combination or rectilinear and curvilinear shapes.

Extending normally backward from the exterior profile 420 of the front frame surface 415 of the frame 405, a plurality of sidewalls 435 partially define an interior 440 of the frame 405. The sidewalls 435 are generally coextensive, extending backward from the front frame surface 415 to define a profile depth of the frame 405 (e.g. profile depth 222 of FIG. 3). In some embodiments, the profile depth of the frame 405 is less than 1".

The mirror platform 410 is affixed within the frame 405 by any suitable fastening means, for example, fasteners, welds, or adhesives. The mirror platform 410 is a planar solid having a rectangular shape. In the illustrated embodiment, the mirror platform 410 is retained within the sidewalls 435 of the frame 405.

The mirror platform 410 includes a central reflective portion 460, a translucent portion 465, and a peripheral portion 470. The translucent portion 465, also referred to as a frosted portion, has minimal reflectivity, and is formed from any suitable material, such as frosted glass, acid etched glass, or clear glass. The number, configuration, and arrangement of translucent portions 465 can be varied to achieve different lighting effects. In the illustrated embodiment, the translucent portion 465 is configured as a single continuous portion disposed between the central reflective portion 460 and the peripheral portion 470. In the illustrated embodiment, an outer perimeter of the translucent portion 465 is aligned with the central aperture 430 of the frame 405. In some embodiments, the outer perimeter of the translucent portion 465 is not aligned with the central aperture 430. In further embodiments, light transmitted through the translucent portion 465 would be at least partially obscured by the front frame surface 415. Alternatively, a portion of the peripheral portion 470 is partially visible within the central aperture 430.

The mirror platform 410 further includes a front reflective surface facing inwardly (e.g. on a surface opposed the central reflective portion 460). The front reflective surface 445 is partially-reflective, configured to reflect a first portion of light incident an interior side of the front reflective surface 445 toward the interior 425 of the frame 405. The front reflective surface 445 further transmits a second portion of the light incident the interior side of the front reflective surface 445 through the central aperture 430.

Disposed within the interior 425 of the frame 405, the mirror assembly 400 includes the mirror platform 410, a light guide plate 450, and a rear reflective surface 455. The light guide plate 450 is disposed behind the front reflective surface 445 of the mirror platform 410. The light guide plate 450 is a solid article made from, for example, acrylic, polycarbonate, glass, or other appropriate material. The light guide plate 450 includes opposed major surfaces 475 and 476 bounded by minor surfaces 480. Light incident on the minor surfaces 480 propagates along the light guide plate 450 by total internal reflection at the opposed major surfaces 475 and 476 of the light guide plate 450. In some embodiments, the light guide plate 450 is configured to diffuse light propagated along the light guide plate 450. In the illustrated embodiment, the light guide plate 450 includes four minor surfaces 480. In some embodiments, the light guide plate 450 may include more or fewer minor surfaces 480.

Adjacent to at least one minor surface 480 of the light guide plate 450, a light emitting element 485 is configured to illuminate the minor surface 480. In the illustrated embodiment, two light emitting elements 485 are disposed adjacent to opposed minor surfaces 480 of the light guide plate 450. The light emitting elements 485 are disposed proximate the minor surfaces 480 and oriented inwardly to illuminate the light guide plate 450. The light emitting elements 485, for example, LEDs, are driven by a driver 490 provided within the frame 405. The driver 490 may be configured to receive AC power from an AC power source, such as a conventional electrical receptacle. Alternatively or additionally, the driver 490 may be configured to receive DC power from a DC power source, for example, a battery.

Disposed adjacent to the rear major surface 476 of the light guide plate 450 is the rear reflective surface 455, the rear reflective surface 455 having a high reflectance. In some embodiments, the reflectance is at least approximately 90%; in some embodiments the reflectance is at least approximately 98%. In some embodiments, the rear reflective surface 455 includes a layer of specular film in order to achieve this reflectance.

Accordingly, light emitted from the light emitting elements 485 enters the minor surfaces 480 and propagate along the light guide plate 450. Light transmitted from the rear major surface 476 of the light guide plate 450 is reflected by the rear reflective surface 455 and re-enters the light guide plate 450. Light transmitted from the front major surface 475 of the light guide plate 450 is incident upon the front reflective surface 445. The front reflective surface 445 reflects a first portion of the light toward the light guide plate 450. The front reflective surface 445 further transmits a second portion of the light through the central aperture 430.

In the illustrated embodiment, the light emitting elements 485 are configured to produce white light, but may be configured to produce any suitable light such as, for example, light of warmer or cooler temperatures. In some embodiments, the light emitting elements 485 are configured to produce color temperatures substantially similar to one or more of an incandescent bulb, a fluorescent bulb, and natural outdoor light.

Disposed adjacent the frame 405 and abutting at least one sidewall 435, the back plate 495 encloses the interior 425 of the frame 405. In some embodiments, the back plate 495 is retained within one or more sidewalls 435. In some embodiments, an outer dimension of a thickness of the back plate 495 and the profile depth of the frame 405 is less than 1".

Figure 5:
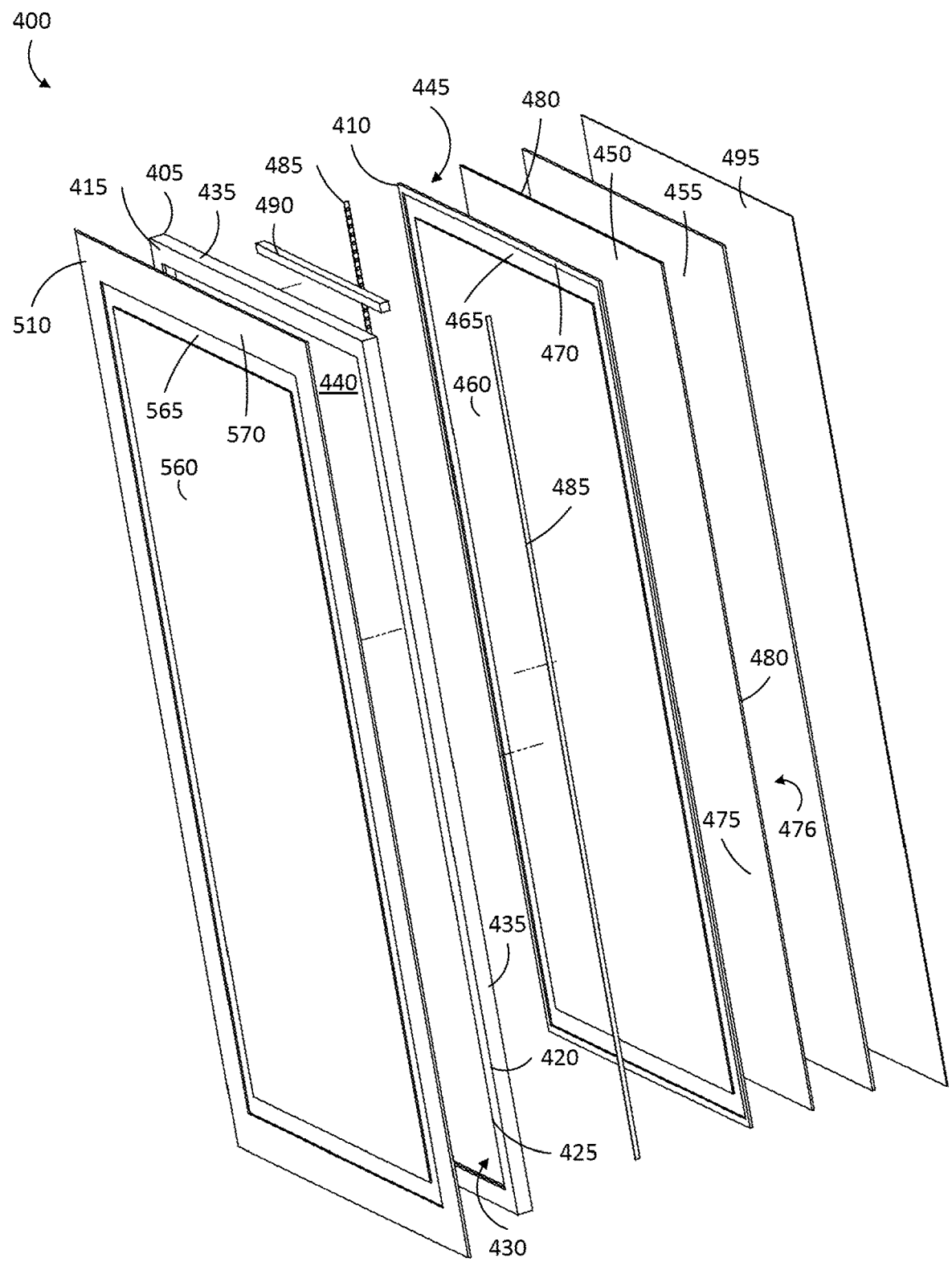
FIG. 5 is an exploded view of the mirror assembly of FIG. 4 according to a third embodiment.

FIG. 5 illustrates another embodiment of the mirror assembly 400 wherein the mirror assembly 400 includes a second mirror platform 510. The second mirror platform 510 is a planar solid having a rectangular shape. In the illustrated embodiment, the second mirror platform 510 extends beyond the exterior profile 420 of the front frame surface 415. In some embodiments, the second mirror platform 510 is generally coextensive with the exterior profile 420 of the front frame surface 415.

The second mirror platform 510 includes a central reflective portion 560, a translucent portion 565, and a peripheral portion 570. The translucent portion 565, also referred to as a frosted portion, has minimal reflectivity, and is formed from any suitable material, such as frosted glass, acid etched glass, or clear glass. The number, configuration, and arrangement of translucent portions 565 can be varied to achieve different lighting effects. In the illustrated embodiment, the translucent portion 565 is configured as a single continuous portion disposed between the central reflective portion 560 and the peripheral portion 570. In the illustrated embodiment, the translucent portion 565 is aligned with the central aperture 430 of the frame 405 as well as the translucent portion 465 of the mirror platform 410.

Figure 6:
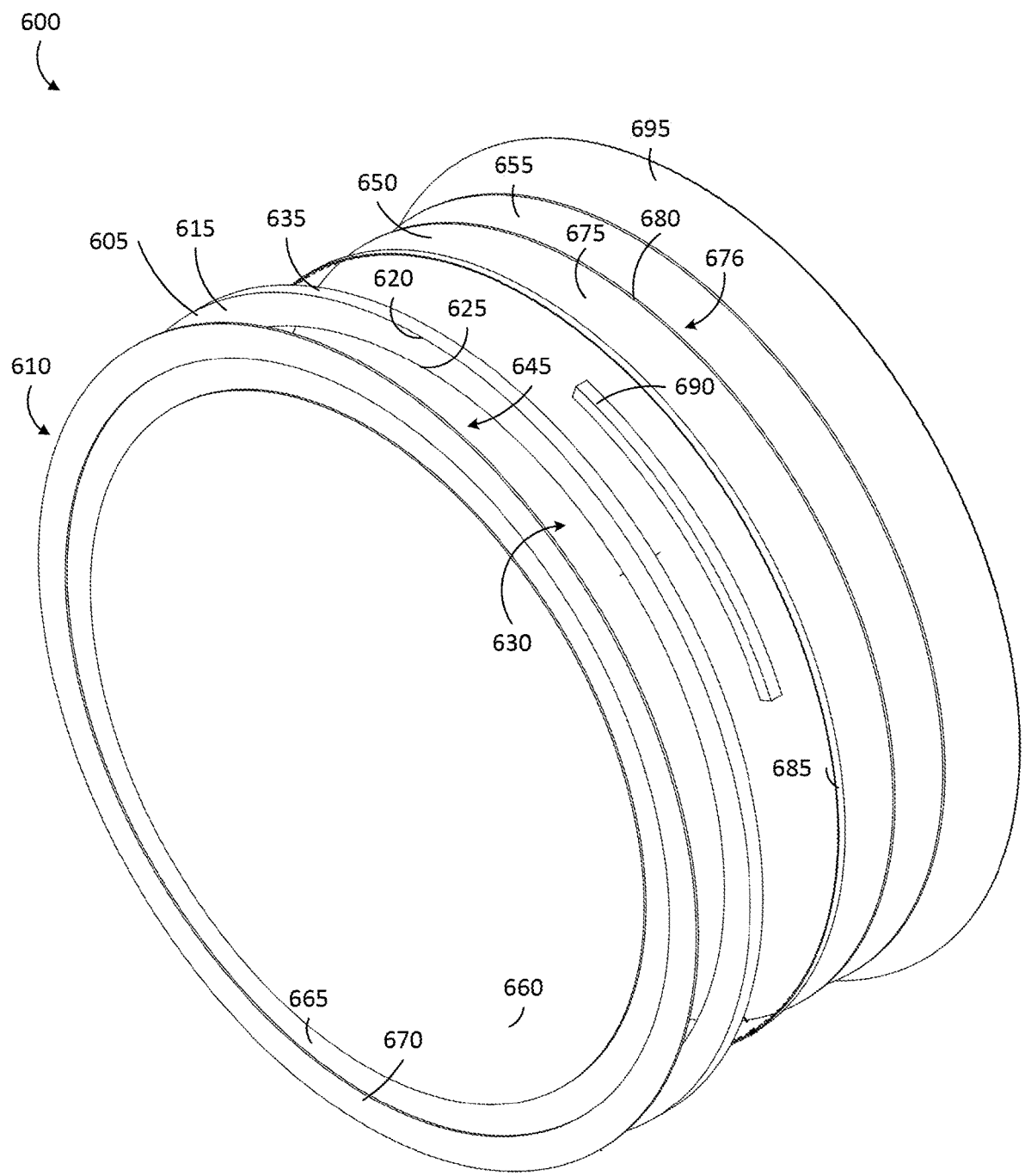
FIG. 6 is an exploded view of a mirror assembly according to a fourth embodiment.

FIG. 6 illustrates another embodiment of a mirror assembly 600. The mirror assembly 600 includes a frame 605 supporting a mirror platform 610. The frame includes a generally planar front frame surface 615 which defines an exterior profile of the frame 605. In the illustrated embodiment, the front frame surface 615 defines a circular exterior profile 620. Alternatively, the front frame surface 615 may define a rectilinear shape, such as a rectangle or a polygon, or any combination or rectilinear and curvilinear shapes.

The frame 605 further includes a central aperture 630 defined by an interior profile 625 of the front frame surface 615. In the illustrated embodiment, the front frame surface 615 defines a circular interior profile 625. Alternatively, the front frame surface 615 may define an interior profile 625 having a rectilinear shape, such as a rectangle or a polygon, or any combination or rectilinear and curvilinear shapes.

Extending normally backward from the exterior profile 620 of the front frame surface 615 of the frame 605, a sidewall 635 partially defines an interior of the frame 605. The sidewall 635 is generally uniform, extending backward from the front frame surface 615 to define a profile depth of the frame 605 (e.g. profile depth 222 of FIG. 3). In some embodiments, the profile depth of the frame 605 is less than 1".

The mirror platform 610 is affixed to the frame 605 by any suitable fastening means, for example, fasteners, welds, or adhesives. The mirror platform 610 is a planar solid having a circular shape. In the illustrated embodiment, the mirror platform 610 is generally coextensive with the exterior profile 620 of the frame 605. In some embodiments, the mirror platform 610 extends beyond the exterior profile 620 of the frame 605.

The mirror platform 610 includes a central reflective portion 660, a translucent portion 665, and a peripheral portion 670. The translucent portion 665, also referred to as a frosted portion, has minimal reflectivity, and is formed from any suitable material, such as frosted glass, acid etched glass, or clear glass. The number, configuration, and arrangement of translucent portions 665 can be varied to achieve different lighting effects. In the illustrated embodiment, the translucent portion 665 is configured as a single continuous portion disposed between the central reflective portion 660 and the peripheral portion 670. In the illustrated embodiment, an outer perimeter of the translucent portion 665 is aligned with the central aperture 630 of the frame 605. In some embodiments, the outer perimeter of the translucent portion 665 is not aligned with the central aperture 630.

The mirror platform 610 further includes a front reflective surface 645 facing inwardly (e.g. on a surface opposed the central reflective portion 660). The front reflective surface 645 is partially-reflective, configured to reflect a first portion of light incident an interior side of the front reflective surface 645 toward the interior of the frame 605. The front reflective surface 645 further transmits a second portion of the light incident the interior side of the front reflective surface 645 through the mirror platform 610.

Disposed within the interior of the frame 605, the mirror assembly 600 includes a light guide plate 650 and a rear reflective surface 655. The light guide plate 650 is disposed behind the front reflective surface 645 adjacent the central aperture 630. The light guide plate 650 is a solid article made from, for example, acrylic, polycarbonate, glass, or other appropriate material. The light guide plate 650 includes opposed major surfaces 675 and 676 bounded by a continuous minor surface 680. Light incident on the minor surface 680 propagates along the light guide plate 650 by total internal reflection at the opposed major surfaces 675 and 676 of the light guide plate 650. In some embodiments, the light guide plate 650 is configured to diffuse light propagated along the light guide plate 650.

Adjacent to the minor surface 680 of the light guide plate 650, a light emitting element 685 is configured to illuminate the minor surface 680. In the illustrated embodiment, a continuous light emitting element 685 is disposed adjacent to opposed minor surfaces 680 of the light guide plate 650. The light emitting element 685 is disposed proximate the minor surface 680 and oriented inwardly to illuminate the light guide plate 650. The light emitting elements 685, for example, LEDs, are driven by a driver 690 provided within the frame 605. The driver 690 may be configured to receive AC power from an AC power source, such as a conventional electrical receptacle. Alternatively or additionally, the driver 690 may be configured to receive DC power from a DC power source, for example, a battery.

Disposed adjacent to the rear major surface 676 of the light guide plate 650 is the rear reflective surface 655, the rear reflective surface 655 having a high reflectance. In some embodiments, the reflectance is at least approximately 90%; in some embodiments the reflectance is at least approximately 98%. In some embodiments, the rear reflective surface 655 includes a layer of specular film in order to achieve this reflectance.

Accordingly, light emitted from the light emitting elements 685 enters the minor surface 680 and propagate along the light guide plate 650. Light transmitted from the rear major surface 676 of the light guide plate 650 is reflected by the rear reflective surface 655 and re-enters the light guide plate 650. Light transmitted from the front major surface 675 of the light guide plate 650 is incident upon the front reflective surface 645. The front reflective surface 645 reflects a first portion of the light toward the light guide plate 650. The front reflective surface 645 further transmits a second portion of the light through the mirror platform 610.

In the illustrated embodiment, the light emitting elements 685 are configured to produce white light, but may be configured to produce any suitable light such as, for example, light of warmer or cooler temperatures. In some embodiments, the light emitting elements 685 are configured to produce color temperatures substantially similar to one or more of an incandescent bulb, a fluorescent bulb, and natural outdoor light.

Disposed adjacent the frame 605 and abutting at least one sidewall 635, the back plate 695 encloses the interior of the frame 605. In some embodiments, the back plate 695 is retained within one or more sidewalls 635. In some embodiments, an overall thickness of the mirror assembly 600 is less than 1".

Figure 7:
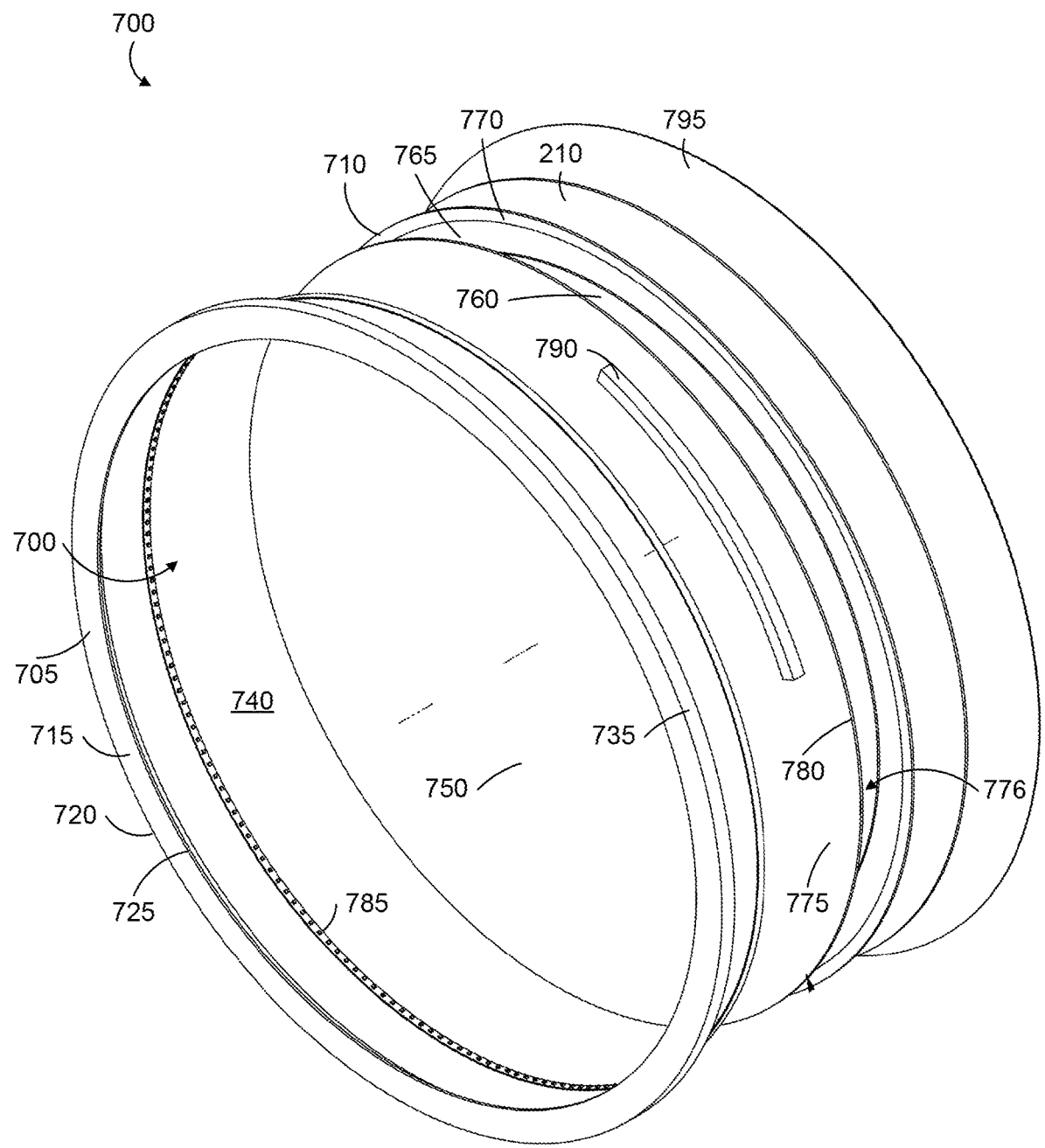
FIG. 7 is an exploded view of a mirror assembly according to a fifth embodiment.

FIG. 7 illustrates another embodiment of a mirror assembly 700. The mirror assembly 700 includes a frame 705 retaining a mirror platform 710. The frame includes a generally planar front frame surface 715 which defines an exterior profile 720 of the frame 705. In the illustrated embodiment, the exterior profile 720 is circular. Alternatively, the front frame surface 715 may define a rectilinear shape, such as a rectangle or polygon, or any combination or rectilinear and curvilinear shapes. In some embodiments, the front frame surface 715 is reflective.

The frame 705 further includes a central aperture 730 defined by an interior profile 725 of the front frame surface 715. In the illustrated embodiment, the front frame surface 715 defines a circular interior profile 725 concentric with the exterior profile 720. Alternatively, the front frame surface 715 may define an interior profile 725 having a rectilinear shape, such as a rectangle or polygon, or any combination or rectilinear and curvilinear shapes.

Extending normally backward from the exterior profile 720 of the front frame surface 715 of the frame 705, a continuous sidewall 735 partially defines an interior 740 of the frame 705. The sidewall 735 is generally uniform, extending backward from the front frame surface 715 to define a profile depth of the frame 705 (e.g. profile depth 222 of FIG. 3). In some embodiments, the profile depth of the frame 705 is less than 1". Retained within the interior 740 of the frame 705 are a light guide plate 750, the mirror platform 710, and a rear reflective surface 755.

The light guide plate 750 is disposed within the interior 740, adjacent the central aperture 730 of the front frame surface 715. The light guide plate 750 is a solid article made from, for example, acrylic, polycarbonate, glass, or other appropriate material. The light guide plate 750 includes opposed major surfaces 775 and 776 bounded by a continuous minor surface 780. Light incident on the minor surface 780 propagates along the light guide plate 750 by total internal reflection at the opposed major surfaces 775 and 776 of the light guide plate 750. In some embodiments, the light guide plate 750 is configured to diffuse light propagated along the light guide plate 750.

Adjacent to the minor surface 780 of the light guide plate 750, a light emitting element 785 is configured to illuminate the minor surface 780. In the illustrated embodiment, a continuous light emitting element 785 disposed adjacent to the minor surface 780 of the light guide plate 750. The light emitting element 785 is disposed proximate the minor surface 780 and oriented inwardly to illuminate the light guide plate 750. The light emitting element 785, for example, LEDs, is driven by a driver 790 provided within the frame 705. The driver 790 may be configured to receive AC power from an AC power source, such as a conventional electrical receptacle. Alternatively or additionally, the driver 790 may be configured to receive DC power from a DC power source, for example, a battery.

The mirror platform 710 is disposed adjacent the rear major surface 776 of the light guide plate 750. The mirror platform 710 is a planar solid having a circular shape. In the illustrated embodiment, the mirror platform 710 is retained within the sidewall 735 of the frame 705.

The mirror platform 710 includes a central reflective portion 760, a translucent portion 765, and a peripheral portion 770. The translucent portion 765, also referred to as a frosted portion, has minimal reflectivity, and is formed from any suitable material, such as frosted glass, acid etched glass, or clear glass. The number, configuration, and arrangement of translucent portions 765 can be varied to achieve different lighting effects. In the illustrated embodiment, the translucent portion 765 is configured as a single continuous portion disposed between the central reflective portion 760 and the peripheral portion 770. In the illustrated embodiment, an outer perimeter of the translucent portion 765 is aligned with the central aperture 730 of the frame 705. In some embodiments, the outer perimeter of the translucent portion 765 is not aligned with the central aperture 730. In further embodiments, light transmitted through the translucent portion 765 would be at least partially obscured by the front frame surface 715. Alternatively, a portion of the peripheral portion 770 may be partially visible within the central aperture 730.

Disposed behind the mirror platform is the rear reflective surface 755, the rear reflective surface 755 having a high reflectance. In some embodiments, the reflectance is at least approximately 90%; in some embodiments the reflectance is at least approximately 98%. In some embodiments, the rear reflective surface 755 includes a layer of specular film in order to achieve this reflectance.

Accordingly, light emitted from the light emitting elements 785 enters the minor surfaces 780 and propagate along the light guide plate 750. A first portion of light transmitted from the rear major surface 776 of the light guide plate 750 is reflected by the central reflective portion 760 and re-enters the light guide plate 750. A second portion of light transmitted from the rear major surface 776 of the light guide plate 750 is transmitted through the translucent portion 765. The second portion of light is then reflected by the rear reflective surface 755 and is transmitted through the mirror platform 710 toward the light guide plate 750. Light transmitted from the front major surface 775 of the light guide plate 750 is transmitted through the central aperture 730.

In the illustrated embodiment, the light emitting element 785 is configured to produce white light, but may be configured to produce any suitable light such as, for example, light of warmer or cooler temperatures. In some embodiments, the light emitting element 785 is configured to produce color temperatures substantially similar to one or more of an incandescent bulb, a fluorescent bulb, and natural outdoor light.

Disposed adjacent the frame 705 and abutting the sidewall 735, the back plate 795 encloses the interior 725 of the frame 705. In some embodiments, the back plate 795 is retained within the sidewall 735. In some embodiments, an outer dimension of a thickness of the back plate 795 and the profile depth of the frame 705 is less than 1".

Thus, the disclosure provides, among other things, an edge-lit mirror having a mirror platform, a light guide plate, and one or more light emitting elements. Various features and advantages of the disclosure are set forth in the following claims.

What is claimed is:

1. A mirror assembly, comprising:
a frame;
a mirror platform including a central reflective portion and a translucent portion;
a light emitting element retained within the frame;
a driver configured to drive the light emitting element, the driver retained within the frame;
a light guide plate adjacent to the light emitting element, the light guide plate including two opposed major surfaces that propagate light along the light guide plate;
a reflective surface adjacent a rear major surface of the light guide plate; and
a back plate.

2. The mirror assembly of claim 1, further comprising:
a front reflective surface facing inwardly and disposed on a surface opposite the central reflective portion.

3. The mirror assembly of claim 2, wherein the front reflective surface is at least partially-reflective.

4. The mirror assembly of claim 1, wherein the light emitting element is configured to produce white light.

5. The mirror assembly of claim 1, wherein an outer dimension of the light guide plate is less than an outer dimension of the reflective surface.

6. The mirror assembly of claim 1, wherein an overall thickness of the mirror assembly is less than one inch.

7. The mirror assembly of claim 1, wherein the translucent portion is configured as a single continuous portion surrounding the central reflective portion.

8. The mirror assembly of claim 1, wherein the light emitting element includes at least one LED.

9. The mirror assembly of claim 1, wherein the light guide plate includes a plurality of minor surfaces which bound the two opposed major surfaces.

10. The mirror assembly of claim 9, further comprising a second light emitting element,
wherein the first light emitting element and the second light emitting element are disposed proximate respective minor surfaces.

11. A mirror assembly, comprising:
a frame;
an internal mirror platform including a central reflective portion and a translucent portion;
an external mirror platform including a central reflective portion and a translucent portion;
a light emitting element retained within the frame;
a driver configured to drive the light emitting element, the driver retained within the frame;
a light guide plate adjacent to the light emitting element, the light guide plate including two opposed major surfaces that propagate light along the light guide plate;
a reflective surface adjacent a rear major surface of the light guide plate; and
a back plate.

12. The mirror assembly of claim 11, wherein the central reflective portion of the internal mirror platform and the central reflective portion of the external mirror platform are coextensive.

13. The mirror assembly of claim 11, further comprising:
a front reflective surface facing inwardly and disposed on a surface opposite the central reflective portion of the internal mirror platform.

14. The mirror assembly of claim 13, wherein the front reflective surface is at least partially-reflective.

15. The mirror assembly of claim 11, wherein the light emitting element is configured to produce white light.

16. The mirror assembly of claim 11, wherein an outer dimension of the light guide plate is less than an outer dimension of the reflective surface.

17. The mirror assembly of claim 11, wherein an overall thickness of the mirror assembly is less than one inch.

18. The mirror assembly of claim 11, wherein the translucent portion of the internal mirror platform is configured as a single continuous portion surrounding the central reflective portion of the internal mirror platform, and wherein the translucent portion of the external mirror platform is configured as a single continuous portion surrounding the central reflective portion of the external mirror platform.

19. The mirror assembly of claim 11, wherein the light guide plate includes a plurality of minor surfaces which bound the two opposed major surfaces.

20. The mirror assembly of claim 19, further comprising a second light emitting element,
wherein the first light emitting element and the second light emitting element are disposed proximate respective minor surfaces.

* * * * *